(12) United States Patent
Chiu et al.

(10) Patent No.: US 12,468,385 B2
(45) Date of Patent: Nov. 11, 2025

(54) DISPLAY APPARATUS

(71) Applicant: Acer Incorporated, New Taipei (TW)

(72) Inventors: Yi-Jung Chiu, New Taipei (TW);
Wei-Kuo Shih, New Taipei (TW);
Chao-Kuang Yang, New Taipei (TW)

(73) Assignee: Acer Incorporated, New Taipei (TW)

( * ) Notice: Subject to any disclaimer, the term of this patent is extended or adjusted under 35 U.S.C. 154(b) by 51 days.

(21) Appl. No.: 18/407,396

(22) Filed: Jan. 8, 2024

(65) Prior Publication Data

US 2025/0147580 A1      May 8, 2025

(30) Foreign Application Priority Data

Nov. 2, 2023   (TW) .................................. 112142293

(51) Int. Cl.
| | | |
|---|---|---|
| G06F 3/01 | (2006.01) | |
| G06T 7/70 | (2017.01) | |
| H04N 5/262 | (2006.01) | |
| H04N 23/90 | (2023.01) | |

(52) U.S. Cl.
CPC .............. G06F 3/013 (2013.01); G06T 7/70 (2017.01); H04N 5/2628 (2013.01); H04N 23/90 (2023.01); *G06T 2207/30201* (2013.01); *G06T 2207/30244* (2013.01)

(58) Field of Classification Search
CPC . G06F 3/013; G06T 7/70; G06T 2207/30201; G06T 2207/30244; H04N 5/2628; H04N 23/90
See application file for complete search history.

(56) References Cited

U.S. PATENT DOCUMENTS

| | | | |
|---|---|---|---|
| 8,244,068 B2 * | 8/2012 | Thorn ................. | G06V 40/165 |
| | | | 382/296 |
| 2024/0334051 A1 * | 10/2024 | Peterson .............. | H04N 23/675 |

FOREIGN PATENT DOCUMENTS

| | | |
|---|---|---|
| CN | 113954751 | 1/2022 |
| CN | 114228620 | 3/2022 |
| CN | 113119863 | 4/2023 |
| CN | 115891829 | 4/2023 |
| TW | 201619930 | 6/2016 |
| TW | 202013149 | 4/2020 |
| TW | 202026695 | 7/2020 |

\* cited by examiner

*Primary Examiner* — Brian P Yenke
*Assistant Examiner* — Omer Khalid
(74) *Attorney, Agent, or Firm* — JCIPRNET

(57) ABSTRACT

A display apparatus including a display screen, a first image capturing element, a second image capturing element, and a control module is disclosed. The display screen is provided with a display surface facing a user. The first image capturing element is disposed on a side of the display surface of the display screen, and is configured to trace an eye position of the user. The second image capturing element is disposed on a side of the display screen facing away from the display surface, and is configured to capture a scene image of a scene located in a line-of-sight of the user and blocked by the display screen. The control module is adapted to display at least a portion of the scene image on the display screen according to the eye position of the user.

8 Claims, 10 Drawing Sheets

DISPLAY APPARATUS

CROSS-REFERENCE TO RELATED APPLICATION

This application claims the priority benefit of Taiwan application serial no. 112142293, filed on Nov. 2, 2023. The entirety of the above-mentioned patent application is hereby incorporated by reference herein and made a part of this specification.

BACKGROUND

Technical Field

This disclosure relates to a display apparatus, and in particular to a display apparatus having a perspective effect.

Description of Related Art

Augmented Reality (AR) and Mixed Reality (MR) display applications have led to the development of transparent displays. In order to balance the effects of perspective and display, transparent displays generally have a display pixel area and a perspective area. Since the design of the perspective area squeezes the layout space of the display pixel area, the display resolution of transparent displays is often lower than that of general displays. In addition, since transparent displays mostly utilize ambient light as the illumination source for display, their display brightness is lower than that of general non-transparent displays, and their display contrast performance is also poorer. Therefore, the development of a display apparatus with perspective effect, high brightness, high contrast, and high resolution is still one of the research and development focuses of the relevant manufacturers.

SUMMARY

The disclosure provides a display apparatus, capable of taking into account both perspective effect and display quality.

The display apparatus of the disclosure includes a display screen, a first image capturing element, a second image capturing element, and a control module. The display screen is provided with a display surface facing a user. The first image capturing element is disposed on a side of the display surface of the display screen, and is configured to track an eye position of the user. The second image capturing element is disposed on a side of the display screen facing away from the display surface, and is configured to capture a scene image of a scene located in a line-of-sight of the user and blocked by the display screen. The control module is adapted to display at least a portion of the scene image on the display screen according to the eye position of the user.

Based on the above, in the display apparatus according to an embodiment of the disclosure, a first image capturing element and a second image capturing element are respectively disposed on opposite sides of the display screen. The first image capturing element is configured to track the eye position of the user. The second image capturing element is configured to capture the scene image located on the side of the display screen facing away from the user and blocked by the display screen. By tracking the current eye position of the user, the control module may adjust the scene image captured by the second image capturing element accordingly and present it on the display screen in real time. No matter how the eyes of the user move, the scene image on the display screen may accurately present the real appearance of the scene behind and blocked by the display screen, so that the user may have a visual experience of seeing through the scene behind the display screen through the display screen.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

DESCRIPTION OF THE EMBODIMENTS

Figure 1A:
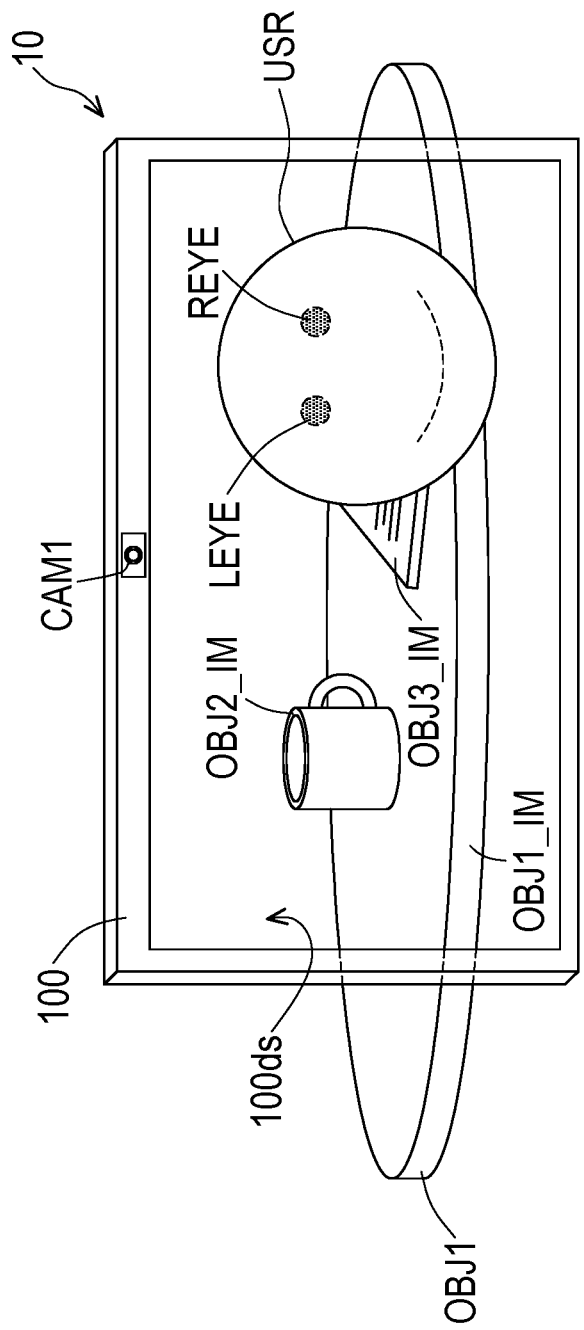
FIG. 1A and FIG. 1B are schematic diagrams of application of a display apparatus according to an embodiment of the disclosure.

In the drawings, the thickness of layers, films, panels, regions, etc., are exaggerated for clarity. It should be understood that when an element such as a layer, film, region, or substrate is referred to as being "on" or "connected to" another element, it can be directly on or connected to the another element, or intermediate elements may also be present. In contrast, when an element is referred to as being "directly on" or "directly connected to" another element, there are no intermediate elements present. As used herein, "connected" may refer to physical and/or electrical connection. Furthermore, "electrical connection" can mean the presence of other elements between the two elements.

Reference will now be made in detail to the exemplary embodiments of the disclosure, examples of which are illustrated in the accompanying drawings. Whenever possible, the same reference numerals are used in the drawings and descriptions to refer to the same or similar parts.

Figure 1B:
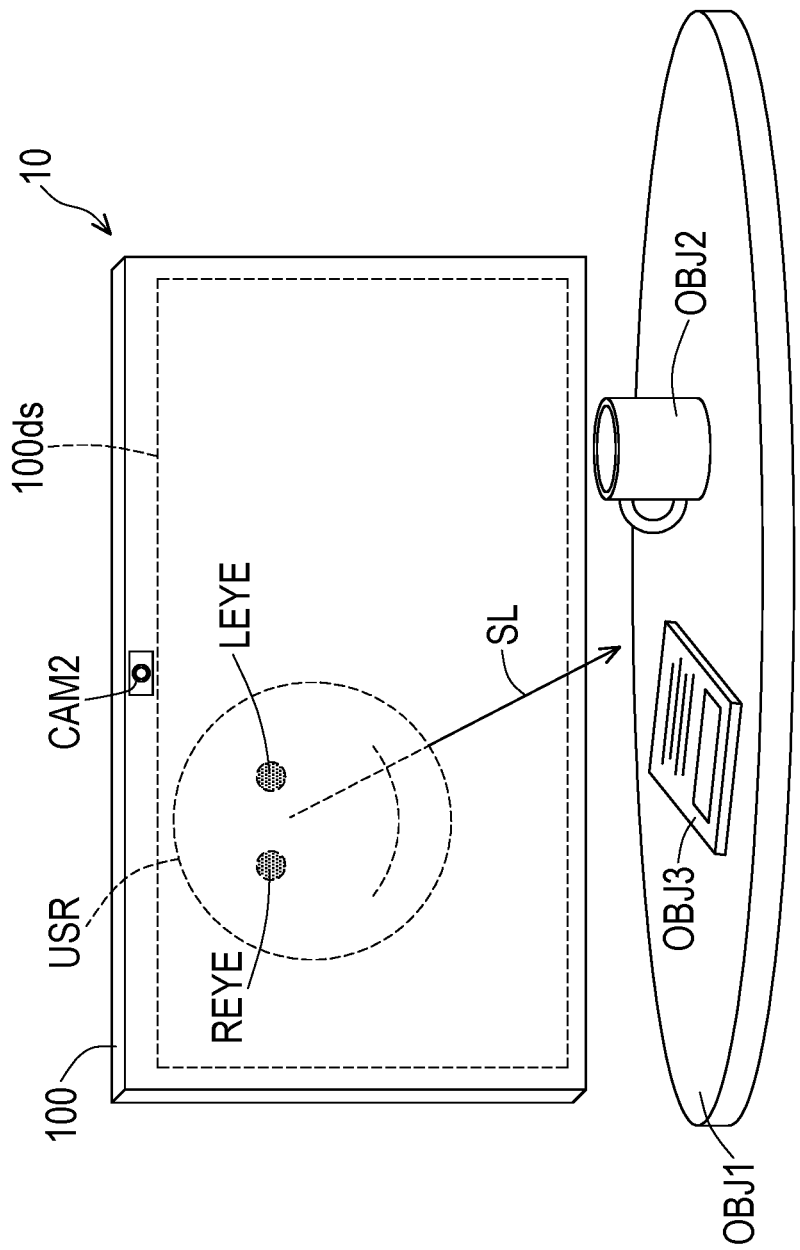
Figure 2:
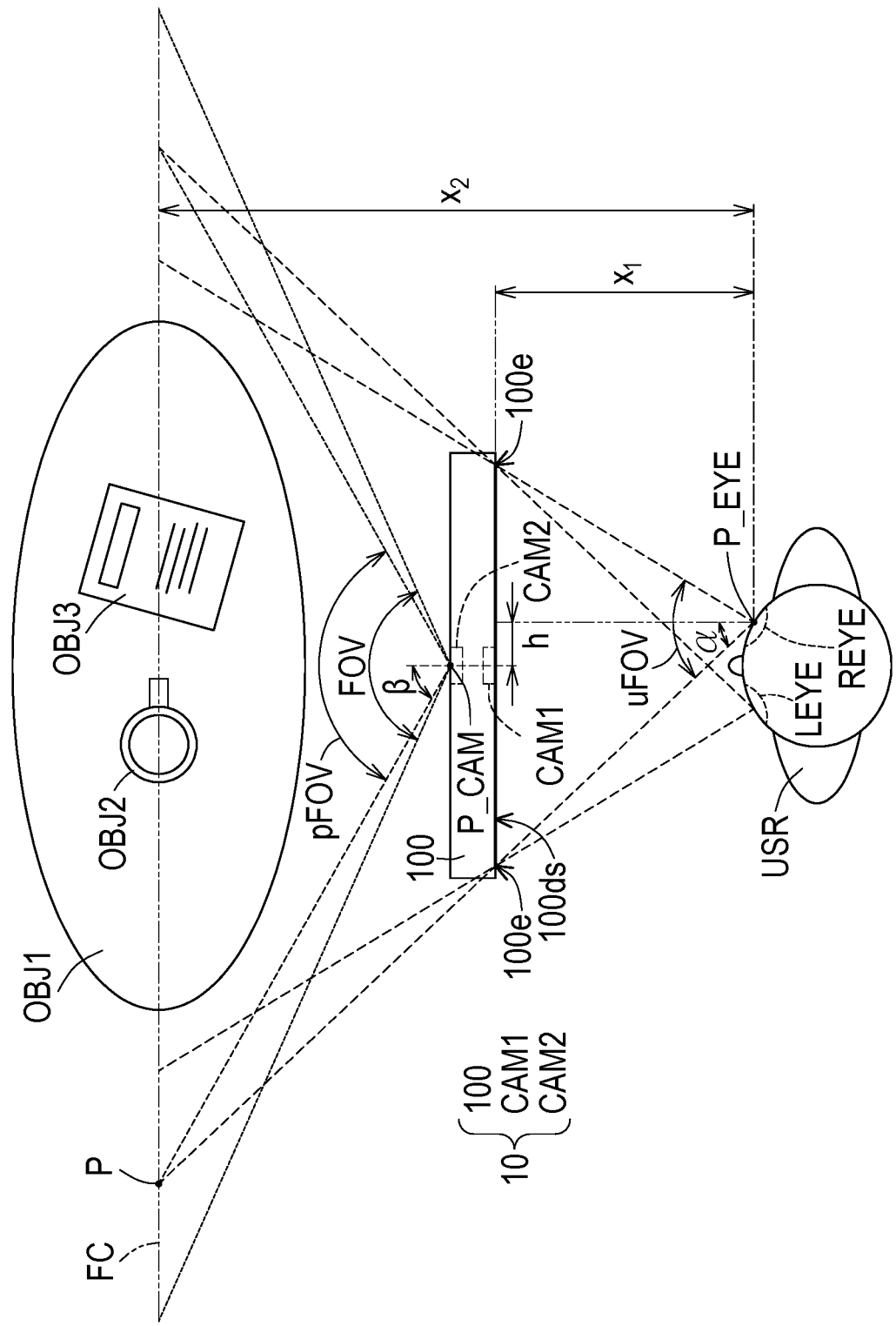
FIG. 2 is a schematic top diagram of the display apparatus of FIG. 1A and FIG. 1B when in use.
Figure 3:
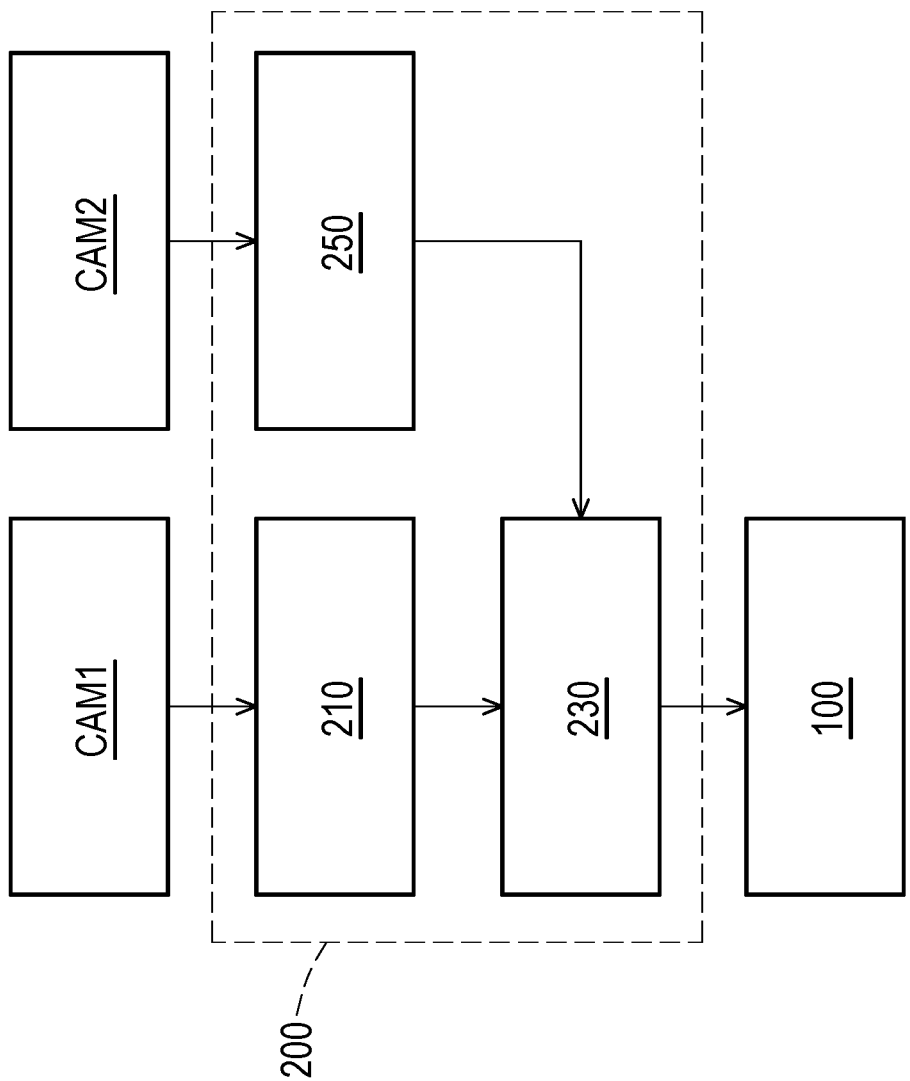
FIG. 3 is a block diagram of the display apparatus of FIG. 1A.
Figure 4:
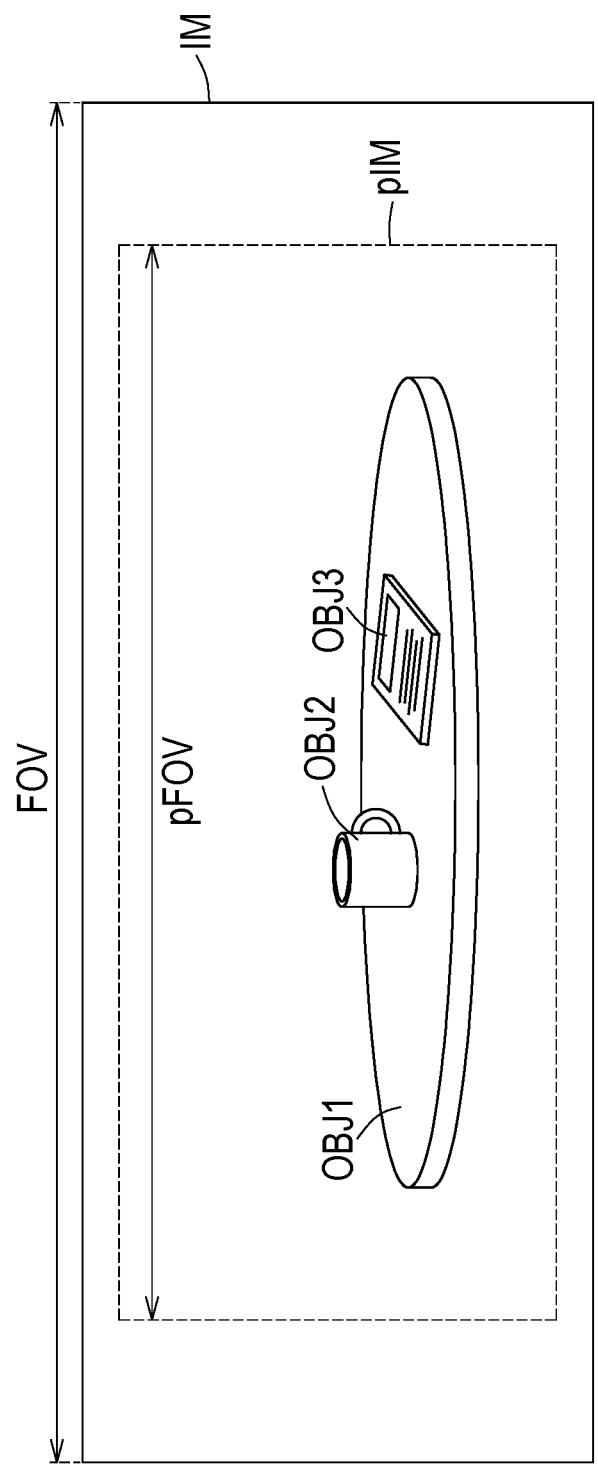
FIG. 4 is a schematic diagram of a scene image captured by a second image capturing element in FIG. 1B.

FIG. 1A and FIG. 1B are schematic diagrams of application of a display apparatus according to an embodiment of the disclosure. FIG. 2 is a schematic top diagram of the display apparatus of FIG. 1A and FIG. 1B when in use. FIG. 3 is a block diagram of the display apparatus of FIG. 1A. FIG. 4 is a schematic diagram of a scene image captured by a second image capturing element in FIG. 1B.

Referring to FIG. 1A, FIG. 1B, and FIG. 2, a display apparatus 10 includes a display screen 100. The display screen 100 has a display surface 100*ds* facing a user USR. In this embodiment, the display screen 100 may be disposed in a screen body of a laptop computer (not shown). That is, the display apparatus 10 may be used as a display monitor of a laptop computer, but is not limited thereto. In other applications, the display apparatus 10 may also be a desktop monitor, such as a professional drawing monitor or a gaming monitor.

In this embodiment, the display screen 100 may be a non-transparent display panel, including, for example, a non-self-luminous display panel (e.g., a liquid crystal display (LCD) panel or an electrophoretic display (EPD) panel) or a self-luminous display panel (e.g., micro light-emitting diode (micro-LED) display panel, organic light emitting diode (OLED) display panel, or mini light emitting diode (mini-LED) display panel), but not limited thereto.

Thus, when the user USR is operating a laptop computer indoors, some of the furnishings or objects in the environment (e.g., an object OBJ1, an object OBJ2, and an object OBJ3) cannot be seen because the opaque display screen 100 (or an undrawn screen body) blocks a line-of-sight SL of the user USR. As shown in the figure, in this embodiment, the object OBJ1, the object OBJ2, and the object OBJ3 are, for example, a table, a cup, and a book respectively, but are not limited thereto.

In order for the display apparatus 10 to have a perspective display effect, the display apparatus 10 is further equipped with a first image capturing element CAM1 and a second image capturing element CAM2. The first image capturing element CAM1 is disposed on a side of the display surface 100ds of the display screen 100, and is configured to track an eye position P_EYE of the user USR located on a side of the display surface 100ds of the display screen 100. The second image capturing element CAM2 is disposed on a side of the display screen 100 facing away from the display surface 100ds, and is configured to capture a scene image IM of scenes (e.g., the object OBJ1, the object OBJ2, and the object OBJ3) blocked by the display screen 100 (as shown in FIG. 4).

Referring to FIG. 2 and FIG. 3, further, the display apparatus 10 further includes a control module 200 electrically coupled to the first image capturing element CAM1, the second image capturing element CAM2, and the display screen 100. The control module 200 is adapted to display at least a portion of the scene image IM captured by the second image capturing element CAM2 on the display surface 100ds of the display screen 100 according to the eye position P_EYE of the user USR tracked by the first image capturing element CAM1.

First of all, in this embodiment, no matter how the eyes of the user USR move, scene images (e.g., an object image OBJ1_IM, an object image OBJ2_IM, and an object image OBJ3_IM) displayed on the display screen 100 may accurately present the real appearance of the scene behind the display 100, so that the user USR may have a visual experience of seeing through the scene behind the display screen 100 through the display screen 100. More specifically, to enhance the realism of the perspective effect of the display apparatus 10, the scene image displayed on the display screen 100100 is adjusted in response to the movement of the eyes of the user.

In detail, the control module 200 may include an eye position calculation unit 210 and an image processing unit 230. The eye position calculation unit 210 is adapted to calculate the eye position P_EYE of the user USR according to an image of the user captured by the first image capturing element CAM1. The image processing unit 230 is adapted to adjust the scene image according to a relative relationship between the eye position P_EYE calculated by the eye position calculation unit 210 and a position P_CAM (i.e., a shooting position) of the second image capturing element CAM2.

Since the second image capturing element CAM2 of this embodiment is disposed on a side of the display screen 100 facing away from the user USR, i.e., closer to the scene to be photographed than a position of the user USR, it is necessary that a field of view (FOV) that the second image capturing element CAM2 can photograph is larger than a field of view (uFOV) defined by the eye position P_EYE of the user USR and a display edge 100e of the display screen 100. In addition, in order to satisfy that the scene image on the display screen 100 can be dynamically adjusted in response to a change in a viewing position of the user USR, the field of view that the second image capturing element CAM2 can capture must cover a range of possible viewing angles of the user USR in relation to the display screen 100.

In this embodiment, the control module 200 may further include a camera field of view calculation unit 250 to obtain the field of view range FOV of the second image capturing element CAM2. For example, the camera field of view calculation unit 250 can calculate the field of view range FOV of the second image capturing element CAM2 according to optical parameters and characteristics (e.g., focal length and sensor size, but not limited thereto) of the second image capturing element CAM2, and determine a shape and coverage of the field of view of the second image capturing element CAM2 in three-dimensional space according to the position P_CAM and the field of view range FOV of the image capturing element CAM2.

Since the field of view FOV that the second image capturing element CAM2 can capture is larger than the field of view uFOV defined by the eye position P_EYE of the user USR and the display edge 100e of the display screen 100, the image processing unit 230 is also adapted to capture a portion of the scene image IM captured by the second image capturing element CAM2 within the field of view FOV according to a relationship between the eye position P_EYE of the user USR and the display edge 100e of the display screen 100 (i.e., a portion of the scene image pIM captured by the second image capturing element CAM2 within a portion of the field of view range pFOV, as shown in FIG. 4). That is, in this embodiment, the control module 200 does not directly display the scene image IM captured by the second image capturing element CAM2 on the display screen 100.

Furthermore, the image processing unit 230 is also adapted to adjust the portion of the scene image pIM captured from the original captured scene image IM according to a geometric relationship between the eye position P_EYE of the user USR and the position P_CAM of the second image capturing element CAM2 in relation to the captured scene.

As shown in FIG. 2, for example, a distance between the eye position P_EYE of the user USR and the display screen 100 in a normal direction of the display surface 100ds is $x_1$. A distance between the eye position P_EYE of the user USR and a position of the scene in the real environment (e.g., including the object OBJ1 to the object OBJ3) in the normal direction of the display surface 100ds is $x_2$. The position of the scene here is, for example, a position of a focus plane FC when the second image capturing element CAM2 captures the scene image IM, and the focus plane FC passes through the object OBJ1, the object OBJ2, and the object OBJ3. On the other hand, a distance between the eye position P_EYE of the user USR and the position P_CAM (i.e., the shooting position) of the second image capturing element CAM2 in a direction parallel to the display surface 100ds (e.g., the horizontal direction in FIG. 2) is h. An angle between a virtual line between any position P in the scene and the eye position P_EYE of the user USR and the normal direction of the display surface 100ds is α. An angle between a virtual line between the position P_CAM of the second image capturing element CAM2 and the any position P in the scene and the normal direction of the display surface 100ds is β.

It should be noted that α and β satisfy the following relational expression:

$$\beta = \tan^{-1}\left[\frac{1}{x_2 - x_1}(x_2\tan(\alpha) - h)\right].$$

This relational expression may correct image distortions in the scene image caused by differences in the viewing angle and position in space between the second image capturing element CAM2, and the eye of the user USR (e.g., a left eye LEYE or a right eye REYE). Then, the control module 200 may correctly map the portion of the scene image pIM that is corrected to the display screen 100 according to the display size and resolution of the display screen 100 to present the correct scene position and size.

Through the above image processing steps, the control module 200 of this embodiment may correspondingly adjust the scene image captured by the second image capturing element CAM2 according to the current eye position P_EYE of the user USR and present it on the display screen 100 in real time. No matter how the eyes of the user USR move, the scene image on the display screen 100 may accurately present the real appearance of the scene behind and blocked by the display screen 100, so that the user USR may have a visual experience of seeing through the scene behind the display screen 100 through the display screen 100.

In addition, unlike the current display technology that uses a transparent display panel to realize the perspective effect, since this embodiment uses a non-transparent display panel as the display screen 100, the display apparatus 10 may have the advantages of high brightness, high contrast, and high resolution in the presentation of the perspective effect, and thus may further enhance the sense of perspective of the user USR to the scene behind the display screen 100 during operation.

Other embodiments will be listed below to describe the disclosure in detail, in which the same components will be marked with the same reference numerals, and the description of the same technical content will be omitted. The omitted parts can be referred to the foregoing embodiments, and will not be repeated in the following.

Figure 5:
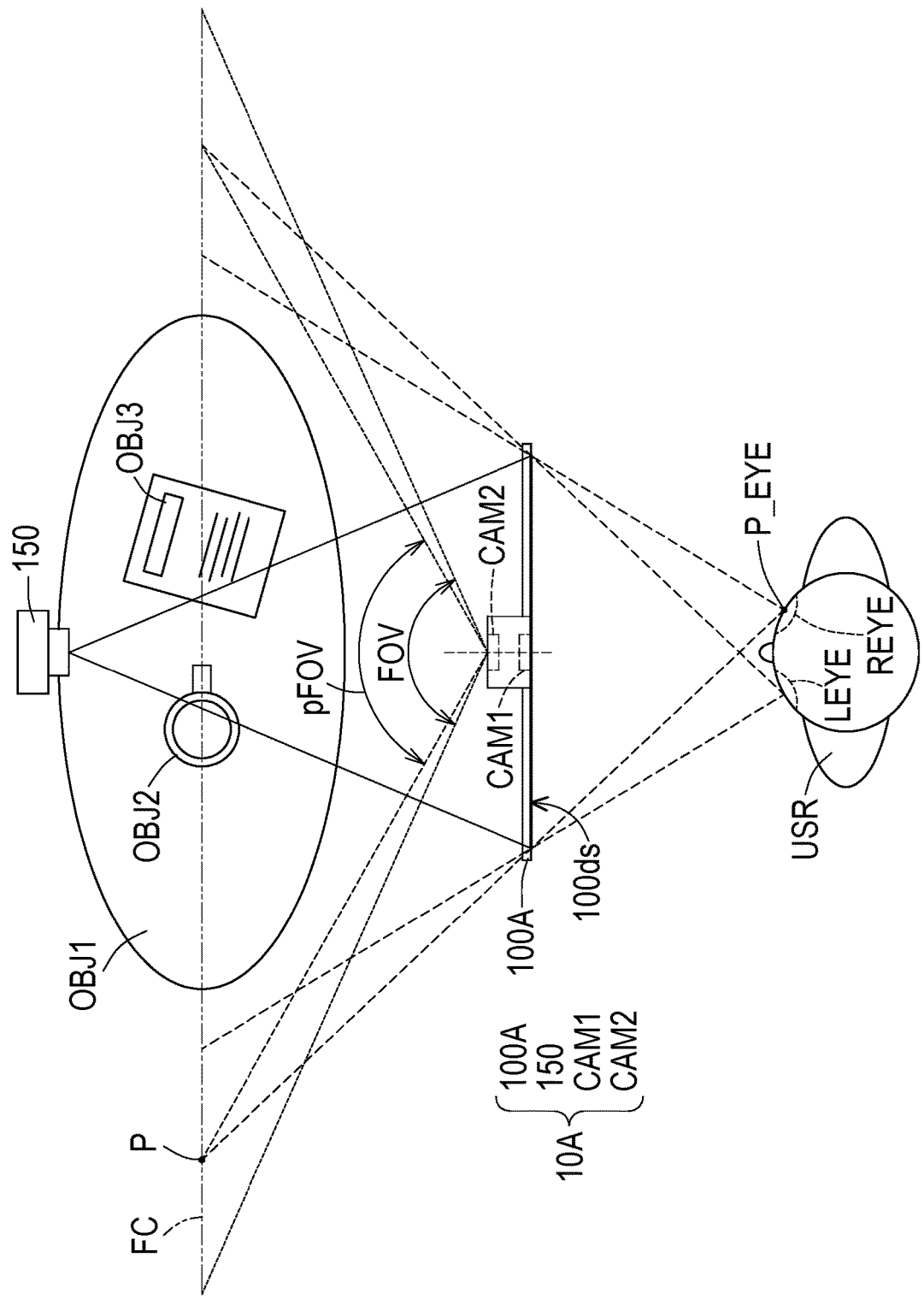
FIG. 5 is a schematic top diagram of a display apparatus when in use according to an embodiment of the disclosure.
Figure 6:
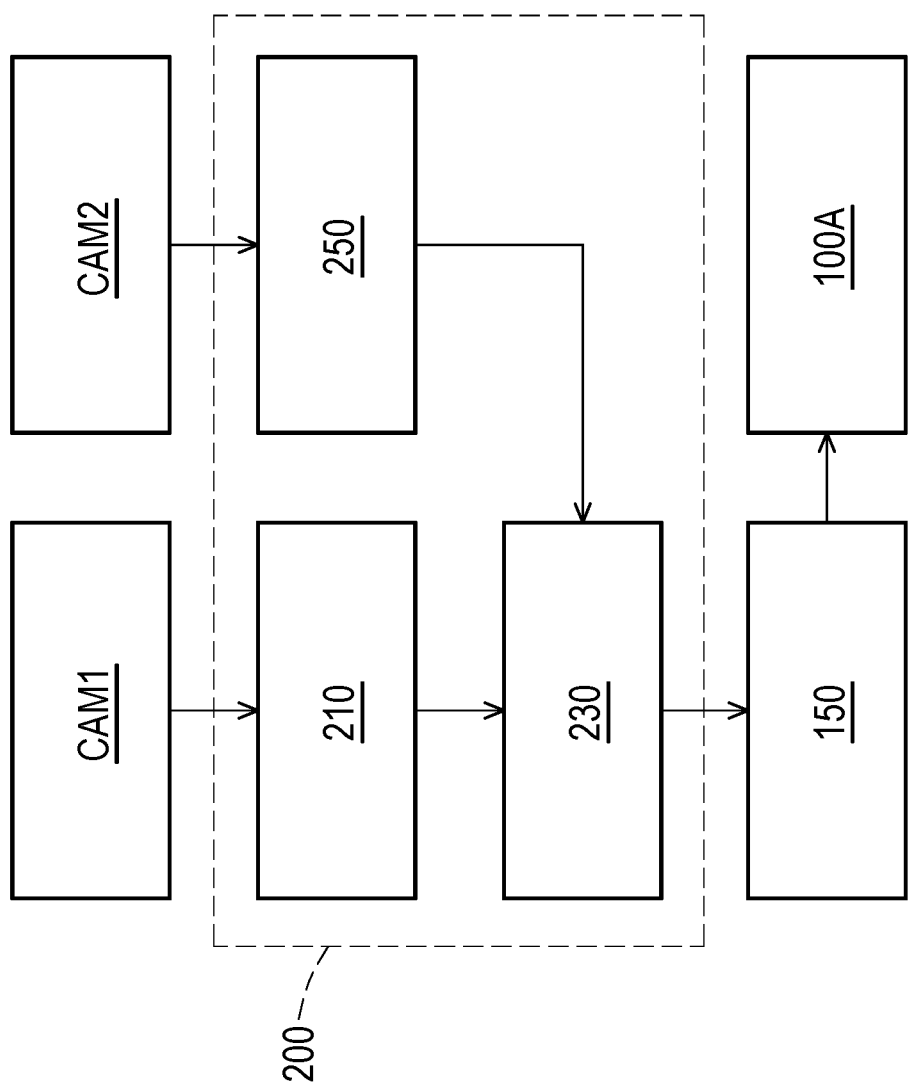
FIG. 6 is a block diagram of the display apparatus of FIG. 5.

FIG. 5 is a schematic top diagram of a display apparatus when in use according to an embodiment of the disclosure. FIG. 6 is a block diagram of the display apparatus of FIG. 5. Referring to FIG. 5 and FIG. 6, the only difference between a display apparatus 10A of this embodiment and the display apparatus 10 of FIG. 2 is that the display mechanism of the display surface is different. For example, in this embodiment, the display apparatus 10A may further include a projection element 150 electrically coupled to the image processing unit 230 of the control module 200.

The projection element 150 is adapted to project the scene image processed by the image processing unit 230 on the display surface 100ds of the display surface 100A. That is, in this embodiment, the display screen 100A may be the projection screen of the projection element 150, but is not limited thereto. Thus, in this embodiment, the control module 200 may correctly map the corrected scene image to the display screen 100A according to the projection mechanism of the display screen 100A to present the correct scene position and size.

Since the configuration of other parts of the display apparatus 10A is similar to the display apparatus 10 of FIG. 2, please refer to the relevant paragraphs of the foregoing embodiments for a detailed description, which will not be repeated in the following.

Figure 7:
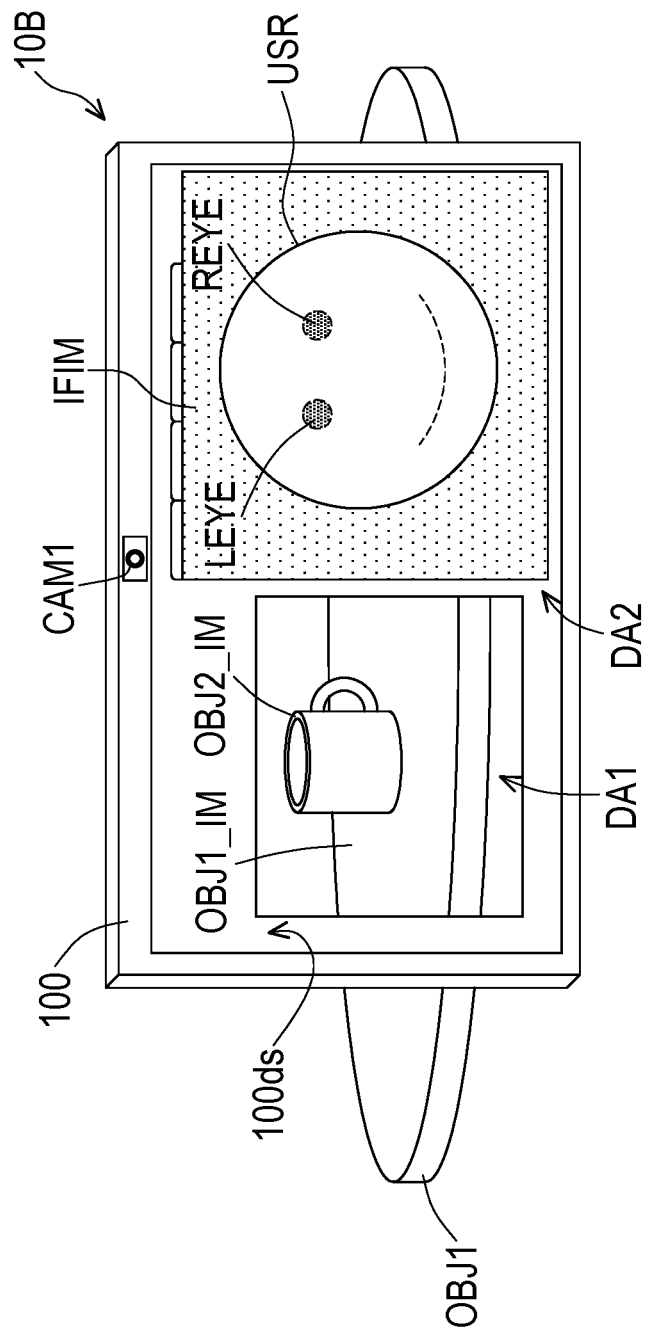
FIG. 7 is a schematic diagram of the display apparatus of FIG. 1A when operated in another display mode.
Figure 8:
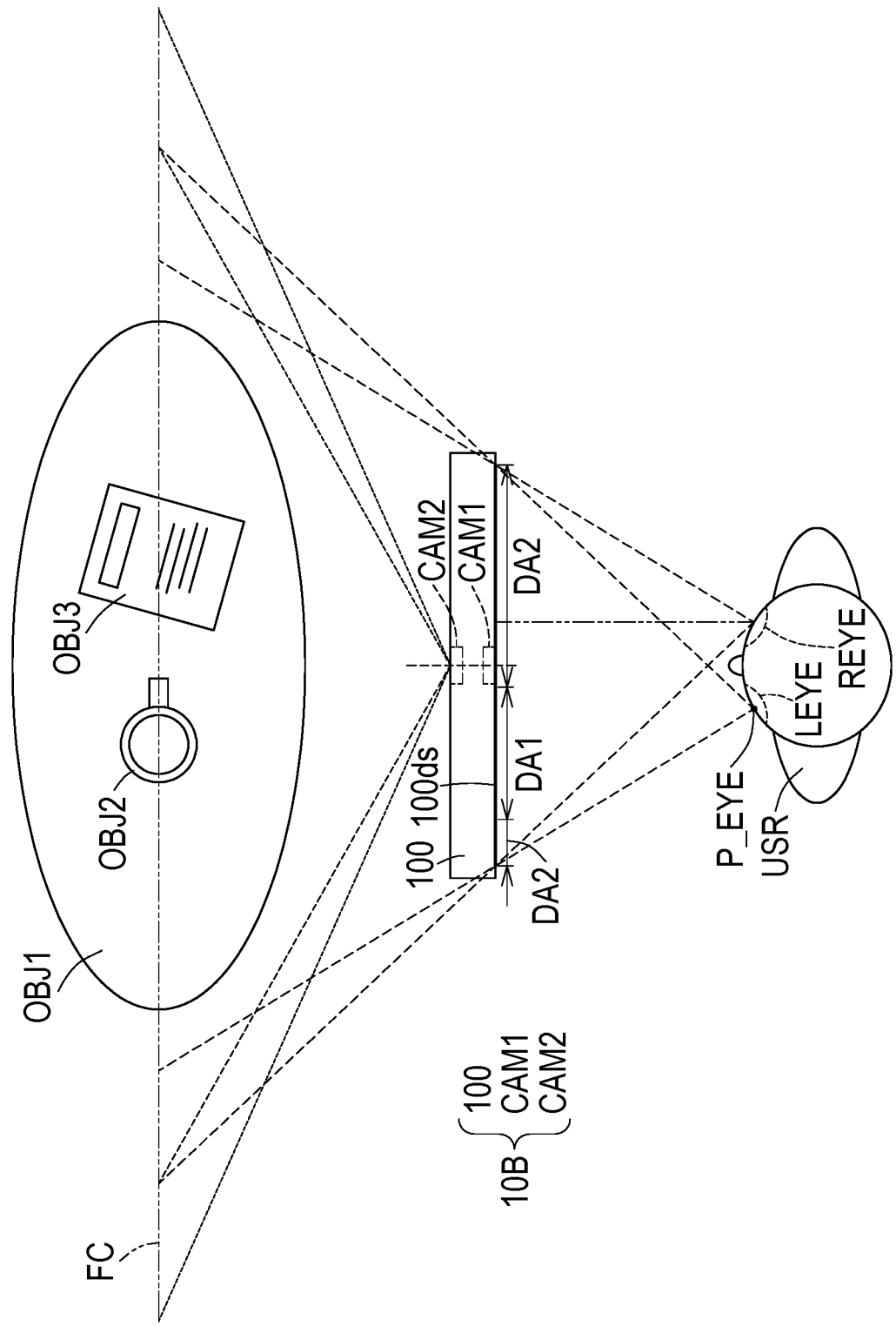
FIG. 8 is a schematic top diagram of the display apparatus of FIG. 1A when operated in another display mode.
Figure 9:
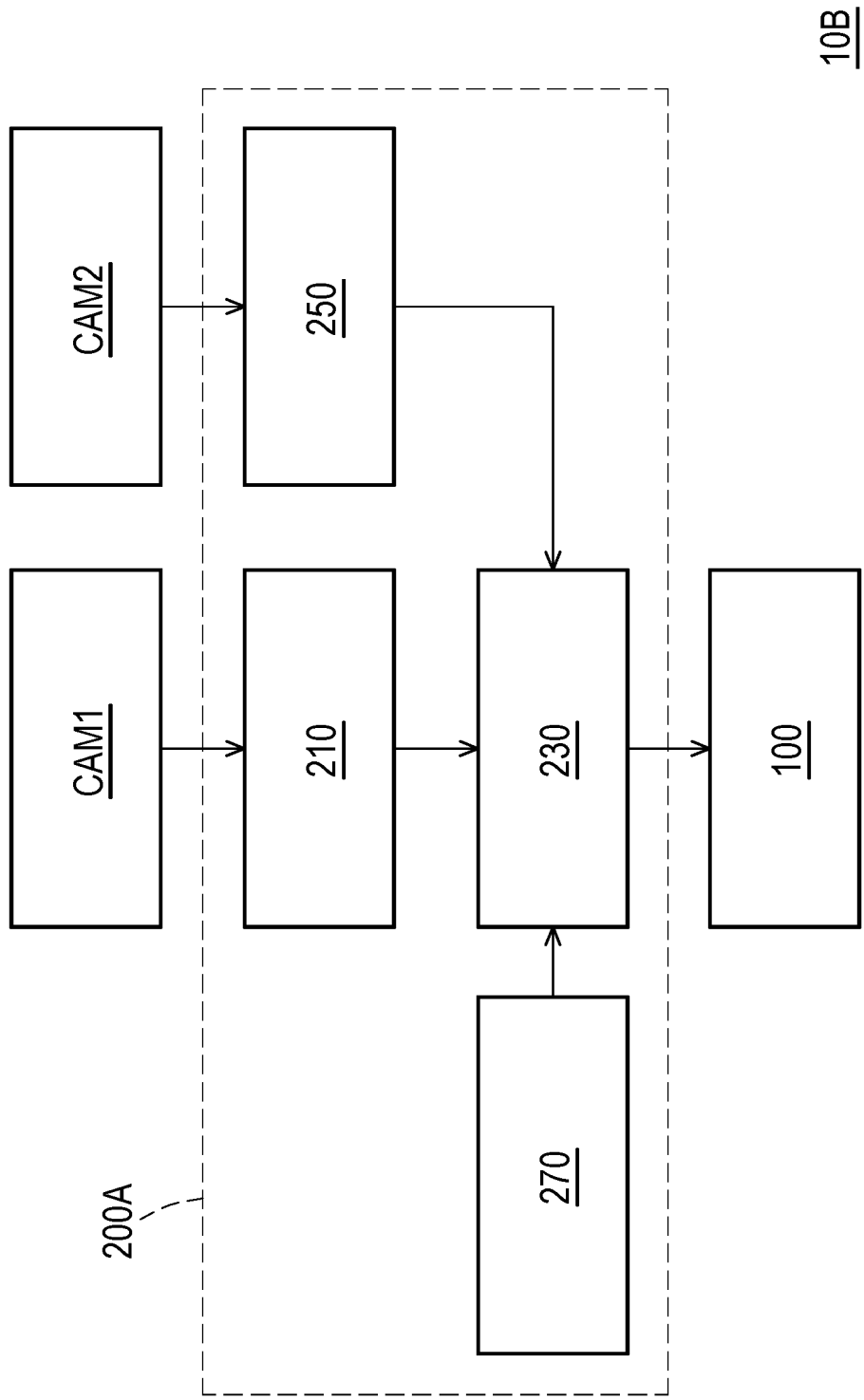
FIG. 9 is a block diagram of the display apparatus of FIG. 8.

FIG. 7 is a schematic diagram of the display apparatus of FIG. 1A when operated in another display mode. FIG. 8 is a schematic top diagram of the display apparatus of FIG. 1A when operated in another display mode. FIG. 9 is a block diagram of the display apparatus of FIG. 8. Referring to FIG. 7 and FIG. 8, in addition to the operation mode of the display apparatus 10 in FIG. 1A, a display apparatus 10B of this embodiment may further achieve a perspective effect in a local area.

For example, the display surface 100ds of the display screen 100 may be provided with a first display area DA1 and a second display area DA2. The control module 200 is adapted to display different portions of the scene images (e.g., the object image OBJ1_IM and the object image OBJ2_IM) and an information image IFIM in the first display area DA1 and the second display area DA2 respectively.

That is, a virtual line between a portion of a real scene corresponding to the portion of the scene image (e.g., the object OBJ2) and the eye position P_EYE of the user USR passes through the first display area DA1 of the display screen 100, as shown in FIG. 8. It should be noted that in this embodiment, although the number of the first display area DA1 is shown as one, in other implementations, the number of the first display area DA1 or the second display area DA2 may also be multiple, depending on the actual application requirements.

In this embodiment, the control module 200A may further include a display area dividing unit 270, which is adapted to divide the display area (i.e., a distribution range of the display surface 100ds) of the display screen 100 into two or more display areas, and to locate the display areas in the display screen 100. The image processing unit 230 is also adapted to correspondingly capture a part of the scene image captured by the second image capturing element CAM2 according to a position of the first display area DA1 divided by the display area dividing unit 270 on the display surface 100ds.

The captured partial scene image may likewise be subjected to image processing steps as mentioned in the foregoing embodiments for deformation correction of the image and adjustment of its mapping relationship when the image is displayed on the display screen 100. Thus, detailed description can be referred to the foregoing embodiments, and will not be repeated in the following.

It should be noted that the display apparatus 10B having a perspective effect in a local area may be widely used in the fields of design or professional drawing. For example, for a user who is drawing, the tools on the drawing software and the actual drawing material behind the display screen 100 may be seen simultaneously by multiple divided display areas of the display screen 100. For users in a meeting, meeting notes and facial expressions of participants may be seen simultaneously through multiple divided display areas of the display screen 100. Regardless of the context of use, this perspective effect in a local area allows users to have different experiences in how the users interpret and interact with the displayed content.

To sum up, in the display apparatus according to an embodiment of the disclosure, a first image capturing element and a second image capturing element are respectively disposed on opposite sides of the display screen. The first image capturing element is configured to track the eye position of the user. The second image capturing element is configured to capture the scene image located on the side of the display screen facing away from the user and blocked by the display screen. By tracking the current eye position of the user, the control module may adjust the scene image captured by the second image capturing element accordingly and present it on the display screen in real time. No matter how the eyes of the user move, the scene image on the display screen may accurately present the real appearance of the scene behind and blocked by the display screen, so that the user may have a visual experience of seeing through the scene behind the display screen through the display screen.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display apparatus, comprising:
a display screen, provided with a display surface facing a user;
a first image capturing element, disposed on a side of the display surface of the display screen, and configured to track an eye position of the user;
a second image capturing element, disposed on a side of the display screen facing away from the display surface, and configured to capture a scene image of a scene located in a line-of-sight of the user and blocked by the display screen; and
a control module, adapted to display at least a portion of the scene image on the display screen according to the eye position of the user, wherein the control module comprises an image processing unit adapted to adjust the scene image according to a relative relationship between the eye position of the user and a shooting position of the second image capturing element, a distance between the eye position of the user and the display screen in a normal direction of the display surface is $x_1$, a distance between the eye position of the user and the scene in the normal direction of the display surface is $x_2$, a distance between the eye position and the shooting position of the second image capturing element in a direction parallel to the display surface is h, an angle between a virtual line between the eye position and any position of the scene and the normal direction of the display surface is $\alpha$, an angle between a virtual line between the shooting position of the second image capturing element and the any position of the scene and the normal direction of the display surface is $\beta$, and $\alpha$ and $\beta$ satisfy the following relational expression:

$$\beta = \tan^{-1}\left[\frac{1}{x_2 - x_1}(x_2 \tan(\alpha) - h)\right].$$

2. The display apparatus according to claim 1, wherein the control module comprises:
an eye position calculation unit, adapted to calculate the eye position of the user according to an image of the user captured by the first image capturing element.

3. The display apparatus according to claim 1, wherein the control module further comprises:
a camera field of view calculation unit, configured to obtain a field of view range of the second image capturing element, wherein the image processing unit is further adapted to capture a portion of the scene image captured by the second image capturing element within a portion of the field of view range according to a relative relationship between the eye position of the user and a display edge of the display screen.

4. The display apparatus according to claim 3, wherein the image processing unit is further adapted to adjust the portion of the scene image according to a relative relationship between the eye position of the user and the shooting position of the second image capturing element.

5. A display apparatus according to claim 1, wherein the display surface of the display screen is provided with a first display area and a second display area, the control module is adapted to display a portion of the scene image and an information image in the first display area and the second display area respectively, the information image is different from the scene image, and a virtual line between a portion of the scene corresponding to the portion of the scene image and the eye position of the user passes through the first display area of the display screen.

6. The display apparatus according to claim 5, wherein the control module further comprises:
a display area dividing unit, adapted to position the first display area and the second display area on the display screen, wherein the image processing unit is further adapted to correspondingly capture a part of the scene image captured by the second image capturing element according to a position of the first display area on the display screen.

7. The display apparatus according to claim 1, wherein the display screen is a non-transparent display panel.

8. The display apparatus according to claim 1 further comprising:
a projection element, adapted to project the at least a portion of the scene image on the display surface of the display screen.

* * * * *